(12) United States Patent
Oguri et al.

(10) Patent No.: US 9,919,593 B2
(45) Date of Patent: Mar. 20, 2018

(54) MOUNT DEVICE AND VEHICLE

(71) Applicant: Yamaha Hatsudoki Kabushiki Kaisha, Shizuoka-ken (JP)

(72) Inventors: Kiyohiko Oguri, Shizuoka (JP); Kazuhiro Nishihara, Shizuoka (JP); Mitsuharu Soma, Shizuoka (JP)

(73) Assignee: YAMAHA HATSUDOKI KABUSHIKI KAISHA, Shizuoka-Ken (JP)

( * ) Notice: Subject to any disclaimer, the term of this patent is extended or adjusted under 35 U.S.C. 154(b) by 0 days.

(21) Appl. No.: 15/490,917

(22) Filed: Apr. 19, 2017

(65) Prior Publication Data
US 2017/0305263 A1    Oct. 26, 2017

(30) Foreign Application Priority Data

Apr. 21, 2016   (JP) .................................. 2016-085411

(51) Int. Cl.
*B60K 13/04* (2006.01)
*F16F 15/08* (2006.01)
*B60K 5/12* (2006.01)

(52) U.S. Cl.
CPC ............ *B60K 13/04* (2013.01); *B60K 5/1208* (2013.01); *F16F 15/08* (2013.01); *F16F 2224/025* (2013.01); *F16F 2230/0005* (2013.01)

(58) Field of Classification Search
CPC ..... B60K 13/04; F16F 7/12; F16F 7/00; F16F 7/087
See application file for complete search history.

(56) References Cited

U.S. PATENT DOCUMENTS

| 2009/0224450 A1* | 9/2009 | Rodecker ............ F01N 13/1811 267/294 |
| 2012/0152643 A1* | 6/2012 | Orihashi .................. B62K 5/01 180/309 |
| 2012/0181411 A1* | 7/2012 | Rodecker ............ F01N 13/1805 248/634 |

* cited by examiner

*Primary Examiner* — John Walters
*Assistant Examiner* — James Triggs
(74) *Attorney, Agent, or Firm* — HEA Law PLLC

(57) ABSTRACT

A mount device includes an inner rod, a damper made of an elastic material to be mounted to the inner rod, and an outer cover to be mounted to the damper. The damper includes a plurality of projecting portions projecting radially outward from the inner rod and small-thickness portions thinner than the plurality of projecting portions in a radial direction. Spaces are formed radially outward of the small-thickness portions. The outer cover includes a plurality of contact surfaces to respectively come into contact with the plurality of projecting portions. The contact surfaces have a larger curvature than that of a circumscribed circle of the damper.

14 Claims, 13 Drawing Sheets

MOUNT DEVICE AND VEHICLE

CROSS-REFERENCE TO RELATED APPLICATION

The present application claims priority from Japanese application JP2016-85411 filed on Apr. 21, 2016, the content of which is hereby incorporated by reference into this application.

BACKGROUND OF THE INVENTION

Description of the Related Art

In a vehicle such as an all-terrain vehicle (ATV), an exhaust device connected to an engine is suspended from a vehicle body frame. In a case where the engine is mounted to the vehicle body frame through the intermediation of a rubber damper so as to absorb vibration of the engine, the exhaust device is displaced relative to the vehicle body frame along with the vibration of the engine. Therefore, in order to allow the displacement described above, the exhaust device is suspended from the vehicle body frame through the intermediation of the rubber damper in some cases.

SUMMARY OF THE INVENTION

Incidentally, a vertical position of the exhaust device suspended from the vehicle body frame is determined in part by the stretchability (elasticity) of the rubber damper. For example, when the rubber damper is likely to stretch, it is necessary to secure a sufficient distance between the vehicle body frame or another component and the exhaust device. Therefore, in view of positioning of the exhaust device, it is preferred that the rubber damper be less likely to stretch in the upward and downward direction.

In the specification of US Patent Application Publication No. 2012/0152643 ("the '643 reference"), there is disclosed a vehicle in which a muffler is suspended from the vehicle body frame through the intermediation of the mount device including a tubular rubber damper. In the mount device, the tubular rubber damper is mounted to a rod fixed to the muffler, and a boss fixed to the vehicle body frame is mounted to the rubber damper. In the mount device, it is conceivable that sufficient allowance for displacement in a rotating direction about the tubular rubber damper as a center is demonstrated. However, displacement in a horizontal direction (displacement in a rightward and leftward direction of the vehicle in the '643 reference) relative to a center axis of the rubber damper of the exhaust device along with vibration of the engine relies on the stretchability of the rubber damper. As described above, the stretchability of the rubber damper is determined in terms of positioning, in other words, in consideration of vertical displacement relative to the center axis of the rubber damper. Therefore, with the tubular rubber damper as described in the '643 reference, the allowance for the displacement of the exhaust device along with the vibration of the engine cannot be sufficiently enhanced in some cases.

The present application has been made to solve the problem described above, and one objective is to provide a mount device and a vehicle capable of achieving both displacement allowance and positioning performance for a target to be suspended.

In preferred embodiments, for example, a mount device includes an inner rod, a damper made of an elastic material and mounted to the inner rod, and an outer cover mounted to the damper. The damper includes a plurality of projecting portions projecting radially outward from the inner rod and small-thickness portions thinner than the plurality of projecting portions in a radial direction. Spaces are formed radially outward of the small-thickness portions. The outer cover includes a plurality of contact surfaces to respectively come into contact with the plurality of projecting portions. The contact surfaces have a larger curvature than that of a circumscribed circle of the damper.

According to one embodiment of the mount device described above, for example, the positioning performance can be improved by setting the stretchability relatively low in a direction in which projecting portions extend relative to an inner rod, while the displacement allowance can be improved by setting the stretchability relatively high in a direction in which small-thickness portions are arranged relative to the inner rod. Further, projecting portions of a damper are brought into contact with contact surfaces of an outer cover having a larger curvature than that of a circumscribed circle of the damper. Thus, rotation of the damper is suppressed, thereby being capable of suppressing a change in a direction of improving the positioning performance and a direction of improving the displacement allowance.

In preferred embodiments, a vehicle includes a vehicle body frame, an engine to be supported by the vehicle body frame, an exhaust device to be connected to the engine and suspended from the vehicle body frame, and a mount device provided between the vehicle body frame and the exhaust device. The mount device includes an inner rod to be fixed to a first part of the vehicle body frame and the exhaust device, a damper made of an elastic material to be mounted to the inner rod, and an outer cover to be fixed to a second part of the vehicle body frame and the exhaust device so as to be mounted to the damper. The damper includes an upper filling portion configured to fill a gap between an upper portion of an outer surface of the inner rod and an upper portion of an inner surface of the outer cover, a lower filling portion configured to fill a gap between a lower portion of the outer surface of the inner rod and a lower portion of the inner surface of the outer cover, and small-thickness portions provided lateral to the outer surface of the inner rod, having a smaller thickness than those of the upper filling portion and the lower filling portion. Spaces are formed radially outward of the small-thickness portions.

According to one embodiment of the vehicle described above, the positioning performance can be improved by setting the stretchability relatively low in the upward and downward direction, while the displacement allowance can be improved by setting the stretchability relatively high in the rightward and leftward direction (e.g., direction in which the small-thickness portions are positioned with respect to the inner rod).

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by referencing the appended figures representing embodiments.

Figure 1:
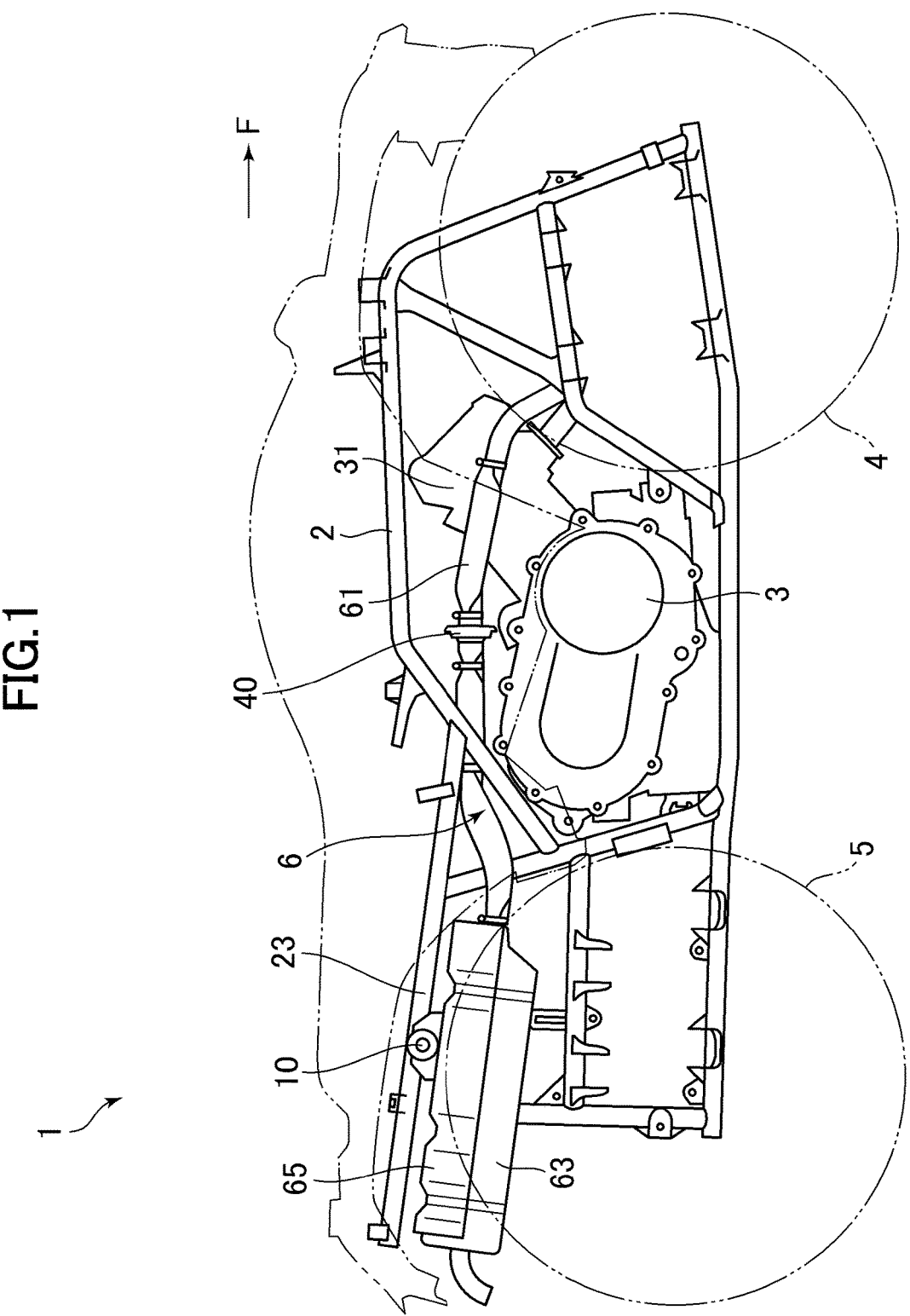
FIG. 1 is a right side view of a vehicle according to a first embodiment.

FIG. 1 is a right side view of a vehicle 1 according to an embodiment. In this embodiment, the vehicle 1 is a four-wheel straddled vehicle including a steering bar, which is called, for example, an all-terrain vehicle (ATV). Alternatively, the vehicle 1 may be a four-wheel vehicle including a plurality of seats arranged in a vehicle width direction and a steering wheel, which is called, for example, a recreational off-highway vehicle (ROV). The vehicle 1 is not limited to those, and may also be, for example, a motor cycle.

In the following description, a forward direction, a rearward direction, an upward direction, a downward direction, a leftward direction, and a rightward direction denote a forward direction, a rearward direction, an upward direction, a downward direction, a leftward direction, and a rightward direction as viewed from a passenger riding on the seat of the vehicle 1. The arrow F in FIG. 1 indicates the forward direction.

The vehicle 1 includes a vehicle body frame 2. The vehicle body frame 2 is formed of, for example, metal pipes made of iron or steel or the like, or formed of an extruded material made of aluminum or an alloy thereof. At a center portion of the vehicle body frame 2 in the forward and rearward direction, an engine 3 is supported. At a lower front portion of the vehicle body frame 2, a pair of front wheels 4 separated from each other in the rightward and leftward direction is supported. At a lower rear portion of the vehicle body frame 2, a pair of rear wheels 5 separated from each other in the rightward and leftward direction is supported.

The engine 3 is mounted to the vehicle body frame 2 through the intermediation of a rubber damper (not shown) so as to absorb vibration of the engine 3. The engine 3 is, for example, a water-cooled type single cylinder engine. A cylinder block 31 of the engine 3 is arranged in a posture inclined so that an axial center of the cylinder formed therein is oriented toward the upper front side.

An exhaust device 6 is connected to the engine 3. The exhaust device 6 is suspended from the vehicle body frame 2. A mount device 10 according to the embodiment is interposed between the vehicle body frame 2 and the exhaust device 6.

The exhaust device 6 may include an exhaust pipe 61 connected to the engine 3 to extend rearward and a muffler 63 connected to the exhaust pipe 61 to extend rearward. The muffler 63 of the exhaust device 6 is suspended from a rear frame 23 of the vehicle body frame 2 through the intermediation of the mount device 10. Further, the exhaust device 6 may include a protector 65 configured to cover the muffler 63. In this embodiment, the exhaust device 6 is positioned on the right side from a center of the vehicle 1 in the rightward and leftward direction. However, the exhaust device 6 may be positioned on the left side from the center of the vehicle 1.

The mount device 10 is provided so as to allow for displacement of the exhaust device 6 relative to the vehicle body frame 2, and to allow for displacement of the exhaust device 6 due to vibration of the engine 3. The engine 3 vibrates in a rotating direction about a crank shaft as a center. Along with displacement due to vibration, the exhaust device 6 connected to the engine 3 to extend in the forward and rearward direction, in particular, the muffler 63 provided to a rear part, is displaced mainly in the forward and rearward direction relative to the vehicle body frame 2.

Figure 2:
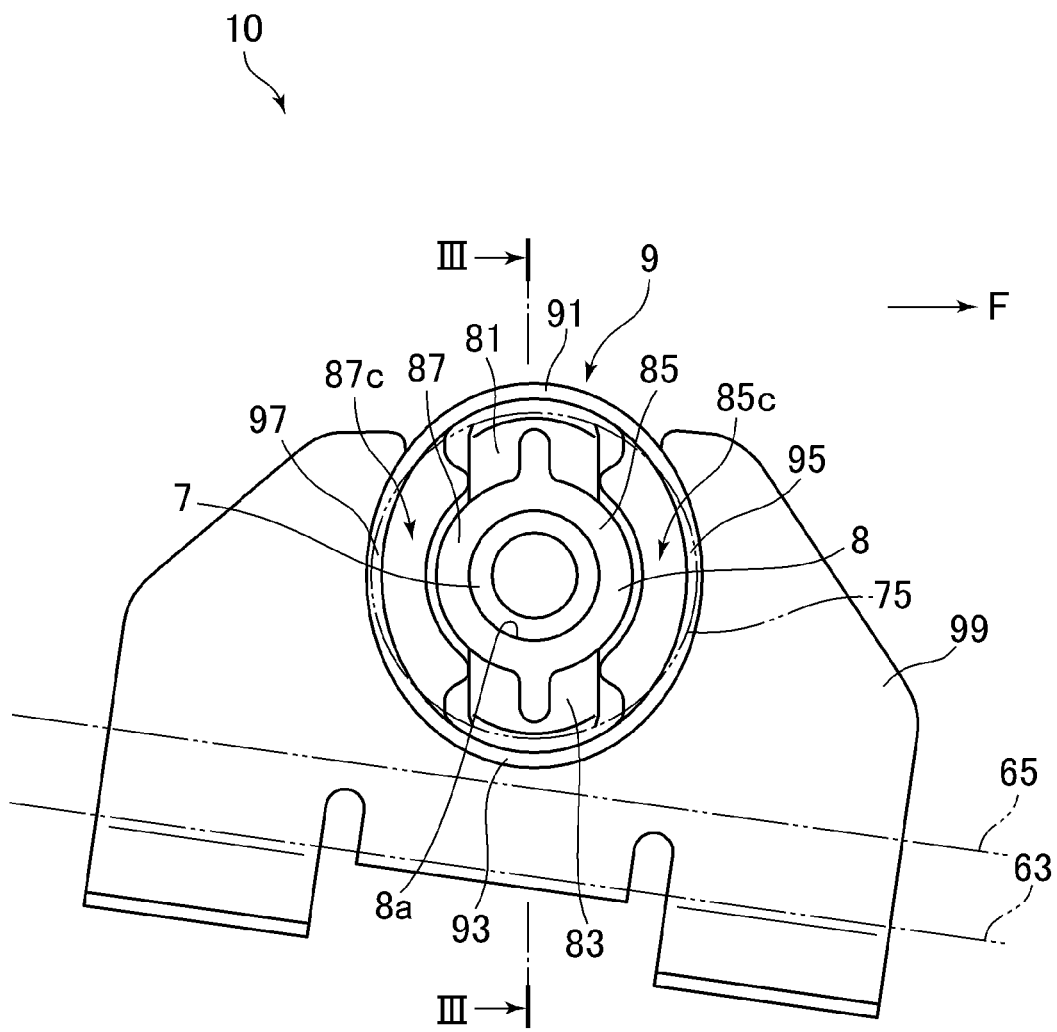
FIG. 2 is an enlarged view of relevant parts of FIG. 1, for illustrating a mount device according to the first embodiment.
Figure 3:
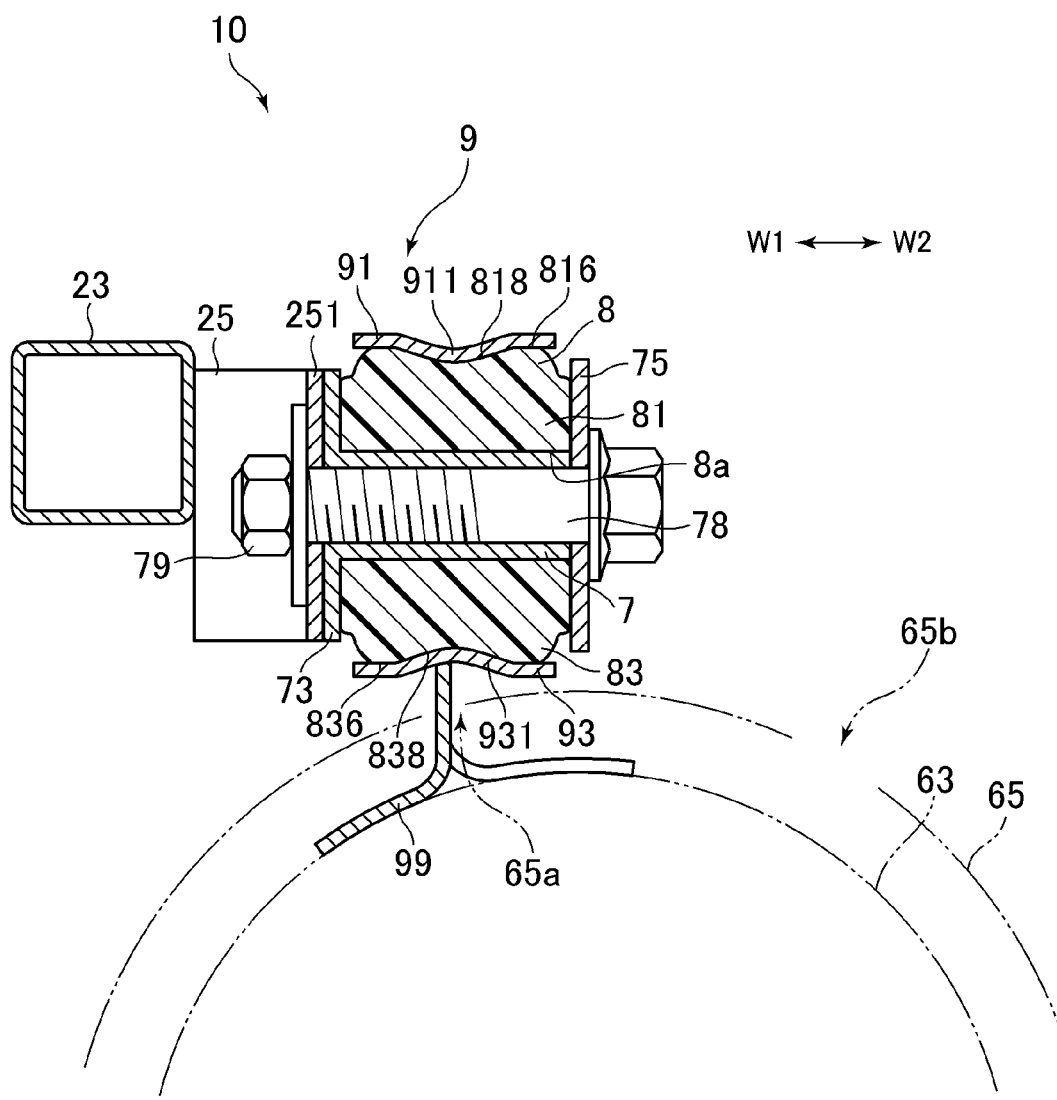
FIG. 3 is a sectional view taken along the line III-III of FIG. 2.
Figure 4:
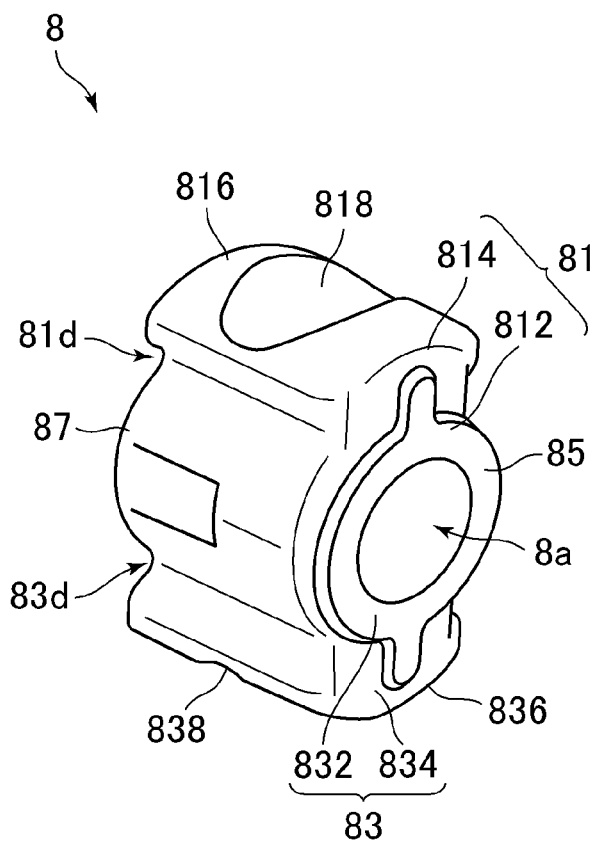
FIG. 4 is a perspective view of a damper.

FIG. 2 is an enlarged view of relevant parts of FIG. 1, for illustrating the mount device 10. In FIG. 2, a flange portion 75 is indicated by a long dashed double-short dashed line, and illustration of a bolt 78 is omitted for the sake of description. The arrow F in FIG. 2 indicates the forward direction. FIG. 3 is a sectional view taken along the line III-III of FIG. 2. The arrow W1 of FIG. 3 indicates the leftward direction, and the arrow W2 indicates the rightward direction. In FIG. 3, the left side is an inner side of the vehicle in the vehicle width direction, and the right side is an outer side of the vehicle in the vehicle width direction.

FIG. 4, FIG. 5, FIG. 6, and FIG. 7 are a perspective view, a front view, a plan view, and a side view, respectively, of the damper 8 included in the mount device 10. A front side in FIG. 4, FIG. 5, FIG. 6, and FIG. 7 corresponds to a surface which is given when the mount device 10 arranged in the vehicle 1 is viewed from the right side in the leftward direction (specifically, from the right side surface in FIG. 1, FIG. 2, and FIG. 3).

The mount device 10 can include an inner rod 7, the damper 8 mounted to the inner rod 7, and an outer cover 9 mounted to the damper 8. The inner rod 7 and the outer cover 9 can be made of a metal, for example, iron or steel. The damper 8 can be made of an elastic material, for example, a rubber. In this embodiment, the inner rod 7 is fixed to the vehicle body frame 2, and the outer cover 9 is fixed to the exhaust device 6. On the contrary, the inner rod 7 may be fixed to the exhaust device 6, and the outer cover 9 may be fixed to the vehicle body frame 2.

The inner rod 7 extends in an axial direction (e.g., rightward and leftward direction). In this embodiment, the inner rod 7 has a hollow cylindrical shape so as to allow insertion of the bolt 78 thereinto. The inner rod 7 is not limited thereto, and may also have a polygonal sectional shape or a solid columnar shape. A flange portion 73 having a radially extending disc-like shape is integrally formed at a left end of the inner rod 7.

The inner rod 7 is mounted to a bracket 25 provided to the rear frame 23 of the vehicle body frame 2. The bracket 25 is fixed to the rear frame 23 by welding or the like, and extends rightward from the rear frame 23 and is bent rearward. The bracket 25 includes a mounting portion 251 having a plate-like shape oriented in the rightward and leftward direction. The flange portion 73 provided to the left end of the inner rod 7 is overlapped with the bracket 25.

On the right side of the inner rod 7, a radially extending disc-like shaped flange portion independent of the inner rod 7 is arranged. A right end of the inner rod 7 is brought into abutment against a left surface of the flange portion 75. The bracket 25, the inner rod 7, and the flange portion 75 are fastened by the bolt 78 inserted therethrough from the right side toward the left side and a nut 79 arranged on the left side of the bracket 25.

The damper 8 is arranged on a radially outer side of the inner rod 7 so as to surround the inner rod 7 in a circumferential direction. The damper 8 has a through hole 8*a* formed so as to pass therethrough in the rightward and leftward direction. The inner rod 7 is fitted into the through hole 8*a*. The damper 8 is arranged between the flange portions 73 and 75 which are respectively provided to the left end and right end of the inner rod 7. The damper 8 is sandwiched between the flange portions 73 and 75 so as to regulate movement in the rightward and leftward direction. Details of a shape of the damper 8 are described below.

The outer cover 9 is arranged on a radially outer side of the damper 8 so as to partially or completely surround the damper 8 in the circumferential direction. The outer cover 9 has a cylindrical shape having a rightward and leftward axial direction. The damper 8 is fitted inside the outer cover 9. Details of a shape of the outer cover 9 are described below.

On an outer surface of the outer cover 9, a bracket 99 configured to support the muffler 63 is fixed by welding or the like. The bracket 99 has a plate-like shape oriented in the rightward and leftward direction, and is arranged on a radially outer side of a portion located below an upper portion 91 of the outer cover 9. A lower portion of the bracket 99 is bent toward any one side in the rightward and leftward direction, and is fixed to the muffler 63 by welding or the like. In this embodiment, the muffler 63 is suspended in a posture inclined toward the upper rear side with respect to the horizontal direction.

Figure 5:
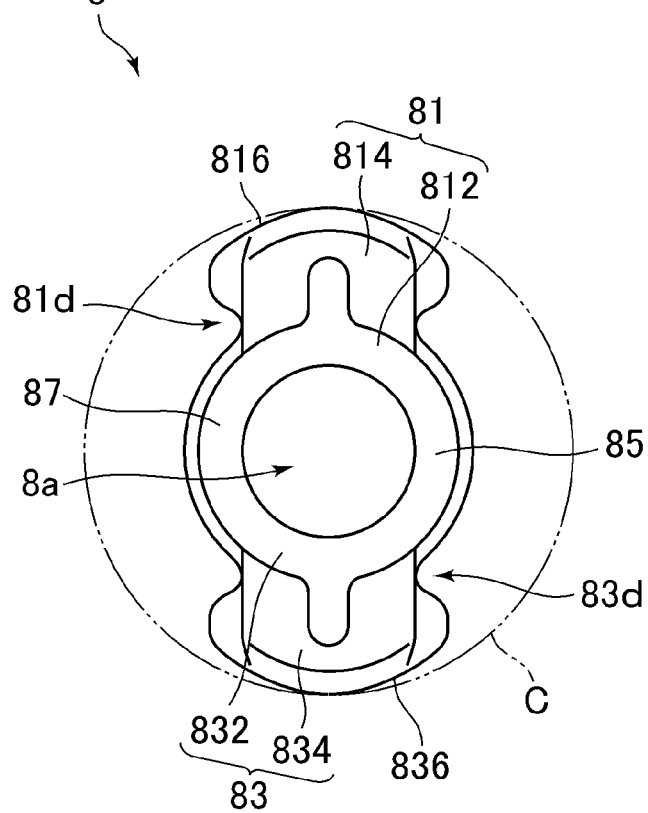
FIG. 5 is a front view of the damper.
Figure 6:
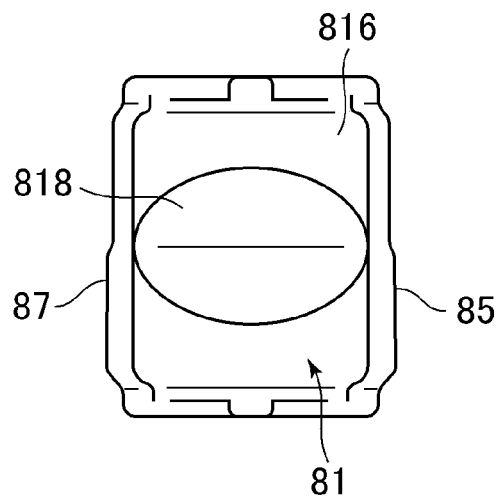
FIG. 6 is a plan view of the damper.
Figure 7:
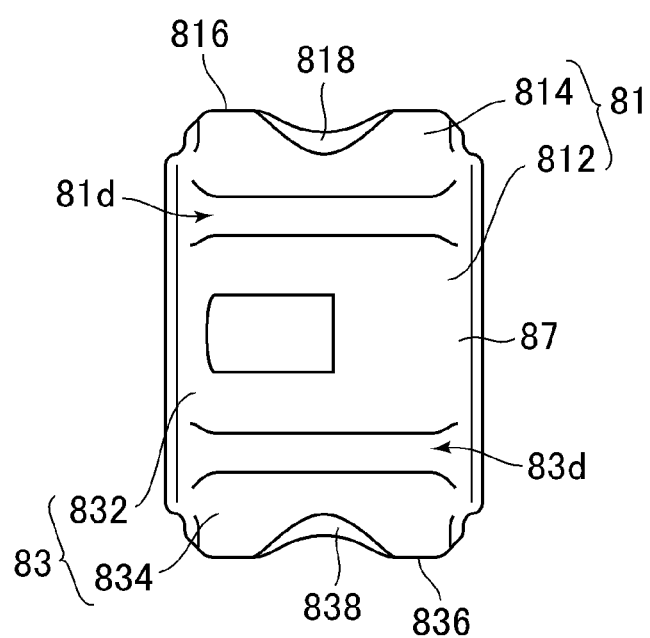
FIG. 7 is a side view of the damper.

As illustrated in FIG. 4, FIG. 5, FIG. 6, and FIG. 7, the damper 8 includes a plurality of projecting portions 81 and 83, each projecting radially outward. A circle indicated by the long dashed double-short dashed line in FIG. 5 is a circumscribed circle C of the damper 8. The circumscribed circle C of the damper 8 is a circle in contact with top points of all the projecting portions 81 and 83. The top points of the projecting portions 81 and 83 are points farthest from a center of the circumscribed circle C of the damper 8. In this embodiment, the center of the circumscribed circle C of the damper 8 is also a center of the through hole 8*a*.

In this embodiment the two projecting portions, 81 and 83 respectively, project in two directions opposite to each other. In the mount device 10 arranged in the vehicle 1, the one projecting portion 81 projects upward from the inner rod 7, and the other projecting portion 83 projects downward from the inner rod 7. The damper 8 extends in the upward and downward direction as a whole.

The projecting portion 81 fills a gap between an upper portion of an outer surface of the inner rod 7 and an upper portion of an inner surface of the outer cover 9 (specifically, an inner surface of the upper portion 91), and is also referred to as "upper filling portion". The projecting portion 83 fills a gap between a lower portion of the outer surface of the inner rod 7 and a lower portion of the inner surface of the outer cover 9 (specifically, an inner surface of the lower portion 93), and is also referred to as "lower filling portion".

The projecting portion 81 that projects upward can include a base end 812 positioned on a radially inner side to come into contact with the inner rod 7 and a distal end 814 positioned on a radially outer side to come into contact with the outer cover 9. A constricted portion 81*d* narrowed in a width direction (forward and rearward direction of the vehicle 1) as compared to the distal end 814, is formed between the base end 812 and the distal end 814. The distal end 814 extends in the width direction as compared to the constricted portion 81*d*.

A surface of the distal end 814, which is oriented radially outward, is a contact surface 816 that comes into contact with the inner surface of the upper portion 91 of the outer cover 9. The contact surface 816 has a larger curvature than that of the circumscribed circle C of the damper 8 as viewed in the axial direction of the through hole 8*a*, and has a radially outwardly convex angular shape. The contact surface 816 gradually separates from the circumscribed circle C of the damper 8 in the circumferential direction from a top point. Specifically, the contact surface 816 has a smaller curvature radius than that of the circumscribed circle C of the damper 8, and is sharply curved.

An engagement portion 818 having a concave shape, which is gently (gradually) recessed radially inward as viewed in the width direction (forward and rearward direction of the vehicle 1), is formed on the contact surface 816 in a middle of the through hole 8*a* in the axial direction.

The projecting portion 83 projecting downward has a shape which is similar to that of the projecting portion 81 projecting upward, and has a base end 832, a distal end 834, a constricted portion 83*d*, a contact surface 836, and an engagement portion 838.

The damper 8 includes small-thickness portions 85 and 87, which are thinner than the projecting portions 81 and 83 in the radial direction, located between the projecting portions 81 and 83 in the circumferential direction. In the mount device 10 arranged in the vehicle 1, the small-thickness portions 85 and 87 are formed on lateral sides of the outer surface of the inner rod 7. Specifically, the one small-thickness portion 85 is positioned on the front side of the inner rod 7, and the another small-thickness portion 87 is positioned on the rear side of the inner rod 7.

The base end 812 of the projecting portion 81 and the base end 832 of the projecting portion 83, and the small-thickness portions 85 and 87 are continuous in the circumferential direction, and form a cylindrical shape having the through hole 8a so as to surround the inner rod 7 in the circumferential direction.

A space 85c is formed on a radially outer side of the small-thickness portion 85, and a space 87c is formed on a radially outer side of the small-thickness portion 87. In this embodiment, the space 85c is formed between the small-thickness portion 85 and a side portion 95 of the outer cover 9, and the space 87c is formed between the small-thickness portion 87 and a side portion 97 of the outer cover 9. Specifically, the one space 85c is formed on the front side of the small-thickness portion 85, and the other space 87c is formed on the rear side of the small-thickness portion 87. Between the distal end 814 of the projecting portion 81 and the distal end portion 834 of the projecting portion 83 in the circumferential direction thereof, the space 85c extends along the small-thickness portion 85, and the space 87c extends along the small-thickness portion 78.

As illustrated in FIG. 2, a sectional shape of the outer cover 9 is not a perfect circle but an oval shape that is longer in the upward and downward direction than in the forward and rearward direction so as to suppress rotation of the damper 8. The oval shape is, for example, an egg shape, an elongated shape, or an ellipsoidal shape. The inner surfaces of the upper portion 91 and the lower portion 93 of the outer cover 9 are two contact surfaces that respectively come into contact with the projecting portions 81 and 83 of the damper 8, and have a larger curvature than that of the circumscribed circle C of the damper 8. Specifically, the inner surfaces of the upper portion 91 and the lower portion 93 of the outer cover 9 have a smaller curvature radius than that of the circumscribed circle C of the damper 8, and are sharply curved.

It is preferred that the curvatures of the inner surfaces of the upper portion 91 and the lower portion 93 of the outer cover 9 be equal to or slightly larger than those of the contact surface 816 of the projecting portion 81 and the contact surface 836 of the projecting portion 83 of the damper 8 so that no gap is formed. In other words, the upper portion 91 and the lower portion 93 of the outer cover 9 sandwich the projecting portions 81 and 83 of the damper 8 therebetween in the circumferential direction.

As shapes of the upper portion 91 and the lower portion 93 of the outer cover 9, the curvatures of the upper portion 91 and the lower portion 93 are not required to be constant, as long as the curvatures are larger than that of the circumscribed circle C of the damper 8 as a whole, specifically, as long as the upper portion 91 and the lower portion 93 of the outer cover 9 can sandwich the projecting portions 81 and 83 of the damper 8 in the circumferential direction. Portions having different curvatures may be combined or may be curved angularly.

An engagement portion 911 having a gentle (gradual) convex shape, which projects radially inward as viewed in the forward and rearward direction, is formed on the upper portion 91 of the outer cover 9 in the middle in the rightward and leftward direction. An engagement portion 913 having a gentle (gradual) convex shape, which projects radially inward as viewed in the forward and rearward direction, is formed on the lower portion 93 of the outer cover 9 in the middle of the rightward and leftward direction. The engagement portions 911 and 913 respectively come into engagement with the engagement portion 818 formed on the projecting portion 81 of the damper 8 and the engagement portion 939 formed on the projecting portion 83 of the damper 8.

The flange portion 75 provided to the right end of the inner rod 7, which is indicated by the long dashed double-short dashed line in FIG. 2, overlaps with a part of the outer cover 8 as viewed in the rightward and leftward direction. More specifically, the flange portion 75 has a disc-like shape, and overlaps with the side portions 95 and 97 of the outer cover 9 and does not overlap with the upper portion 91 and the lower portion 93.

According to this embodiment, the damper 8 is relatively less liable to stretch in the upward and downward direction of the vehicle 1, in which the projecting portions 81 and 83 are positioned relative to the inner rod 7. Therefore, vertical positioning performance for the muffler 63 suspended from the rear frame 23 can be improved. Meanwhile, the damper 8 is relatively more likely to stretch in the forward and rearward direction of the vehicle 1, in which the small-thickness portions 85 and 87 are positioned relative to the inner rod 7, due to the presence of the spaces 85c and 87c. Therefore, the displacement allowance for the displacement of the muffler 63 in the forward and rearward direction along with the vibration of the engine 3 can be improved.

Further, the inner surfaces of the upper portion 91 and the lower portion 93 of the outer cover 9, which come into contact with the projecting portions 81 and 83 of the damper 8, have a larger curvature than that of the circumscribed circle C of the damper 8, and the projecting portions 81 and 83 of the damper 8 are sandwiched therebetween in the circumferential direction. Therefore, the rotation of the damper 8 can be suppressed. Thus, the posture of the damper 8 can be maintained so that a direction in which the damper 8 demonstrates the positioning performance is not shifted from the upward and downward direction and that a direction in which the damper 8 demonstrates the displacement allowance is not shifted from the forward and rearward direction.

The direction in which the damper 8 demonstrates the positioning performance and the direction in which the damper 8 demonstrates the displacement allowance are respectively set to the upward and downward direction and the forward and rearward direction in this embodiment. However, the above-mentioned directions are not limited thereto. The directions may be set to arbitrary directions through adjustment of the posture of the damper 8.

Further, in this embodiment, the projecting portions 81 and 83 of the damper 8, project in opposite directions corresponding to the upward and downward direction. In the forward and rearward direction, perpendicular to the upward and downward direction, the spaces 85c and 87c of the damper 8 are positioned. With this configuration, a difference in stretchability of the damper 8 is increased to achieve the improvement of both the positioning performance and the displacement allowance. The projecting portions 81 and 83 of the damper 8 are not limited thereto. The projecting portions 81 and 83 of the damper 8 are not required to project in opposite directions as long as the damper 8 can demonstrate the positioning performance and the displacement allowance in predetermined directions different from each other, and three or more projecting portions may be provided.

Figure 8:
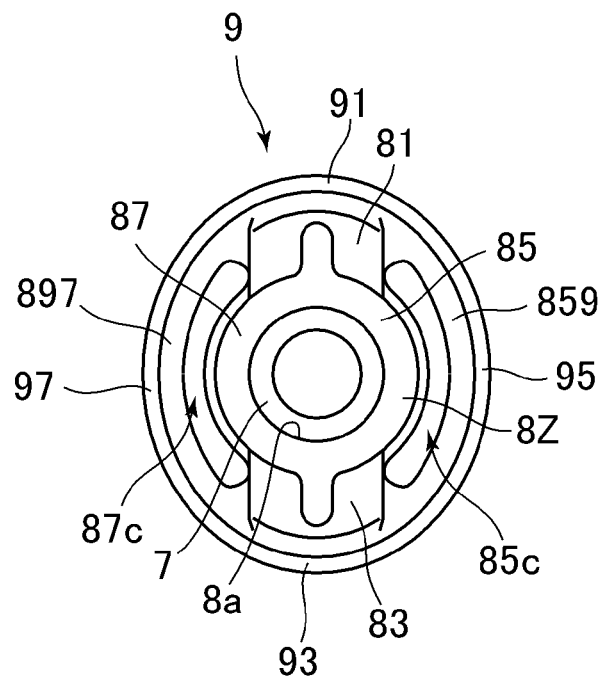
FIG. 8 is a view for illustrating a mount device according to a first modification example.
Figure 9:
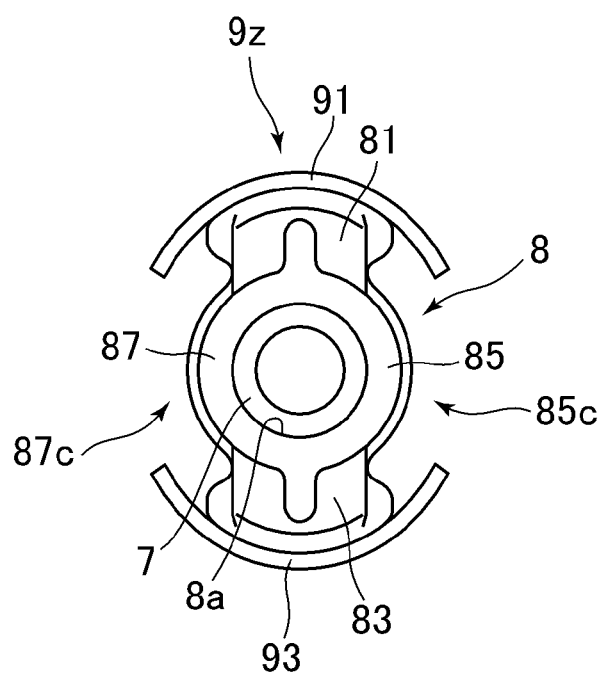
FIG. 9 is a view for illustrating a mount device according to a second modification example.

Further, in this embodiment, the space 85c is formed between the small-thickness portion 85 of the damper 8 and the side portion 95 of the outer cover 9, and the space 87c is formed between the small-thickness portion 87 of the damper 8 and the side portion 97 of the outer cover 9. With this configuration, a given amount of relative movement can be regulated while securing a distance in which the inner rod 7 and the outer cover 9 can move relative to each other in the forward and rearward direction. The spaces 85c and 87c are not limited thereto. As in a case of a damper 8Z according to an example illustrated in FIG. 8, an outer covering portion 859 to be brought into contact with the side portion 95 of the outer cover 9 and an outer covering portion 879 to be brought into contact with the side portion 97 of the outer cover 9 may be provided between the projecting portions 81 and 83 in the circumferential direction so as to form the space 85c between the small-thickness portion 85 and the outer covering portion 859 and the space 87c between the small-thickness portion 87 and the outer covering portion 879. Further, as in a case of an outer cover 9Z according to a modified example illustrated in FIG. 9, the outer cover 9Z may be divided into two parts respectively including the upper portion 91 and the lower portion 93 without providing the side portions 95 and 97 so that the spaces 85c and 87c may be continuous with an outside of the outer cover 9Z.

Further, in this embodiment, the engagement portion 818 formed on the contact surface 816 of the projecting portion 81 and the engagement portion 838 formed on the contact surface 836 of the projecting portion 83 of the damper 8 come into contact with the engagement portion 911 formed on the inner surface of the upper portion 91 and the engagement portion 913 formed on the inner surface of the lower portion 93 of the outer cover 9 in the rightward and leftward direction. According to this configuration, a shift between the damper 8 and the outer cover 9 in the rightward and leftward direction can be suppressed. Further, each of the engagement portions 818 and 838 has a concave shape recessed radially inward. Therefore, a volume of the damper 8 can be reduced to save raw material. On the contrary, each of the engagement portions 818 and 838 may be formed in a convex portion, whereas each of the engagement portions 911 and 913 may be formed in a concave shape.

Still further, in this embodiment, the flange portion 75 indicated by the long dashed double-short dashed line in FIG. 2, which is provided to the right end of the inner rod 7, overlaps with a part of the outer cover 9 as viewed in the rightward and leftward direction. With this configuration, even when the outer cover 9 is moved rightward, the outer cover 9 is brought into abutment against the flange portion 75. Therefore, the outer cover 9 can be prevented from being removed in the rightward direction. The flange portion 75 is not limited thereto. The flange portion 75 may overlap with the entire outer cover 9 as viewed in the rightward and leftward direction. Similarly, the flange portion 73 provided to the left end of the inner rod 7 may overlap with at least a part of the outer cover 9 as viewed in the rightward and leftward direction.

Figure 10:
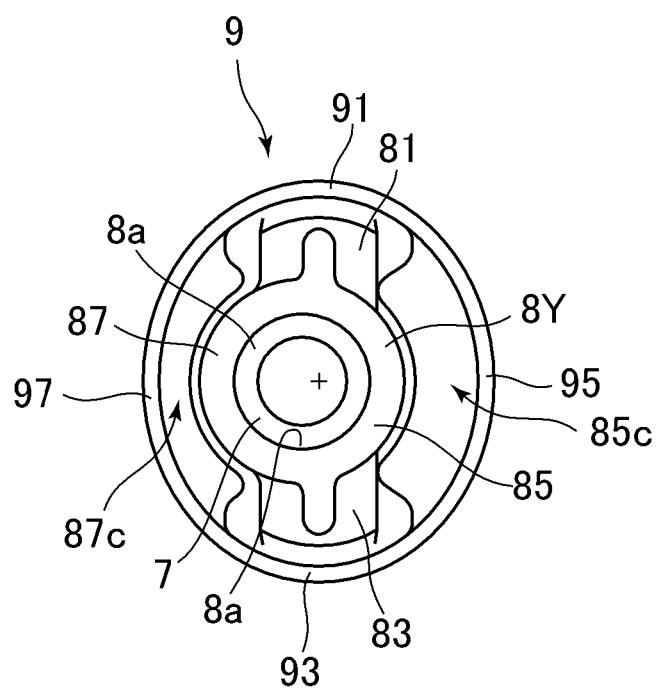
FIG. 10 is a view for illustrating a mount device according to a third modification example.

Still further, in this embodiment, the center of the inner rod 7, the center of the circumscribed circle of the damper 8, and the center of the outer cover 9 match with each other. However, a relationship between the above-mentioned centers is not limited thereto. For example, as in a case of a damper 8Y according to a modified example illustrated in FIG. 10, the center of the inner rod 7 may be offset from the center of the circumscribed circle of the damper 8Y or from the center of the outer cover 9. In FIG. 10, the center of the circumscribed circle of the damper 8Y, which is also the center of the outer cover 9, is indicated by the cross mark. In this example, the inner rod 7 has a rearward offset. As a result, in the forward and rearward direction, a length of the space 85c formed on the front side of the inner rod 7 is larger than the space 87c formed on the rear side. With this configuration, when the exhaust pipe 61 and the muffler 63 included in the exhaust device 6 are extended in the forward and rearward direction due to thermal expansion, the center of the inner rod 7 can be brought closer to the center of the outer cover 9.

Now, a specific configuration of the exhaust device 6 is described.

Figure 11:
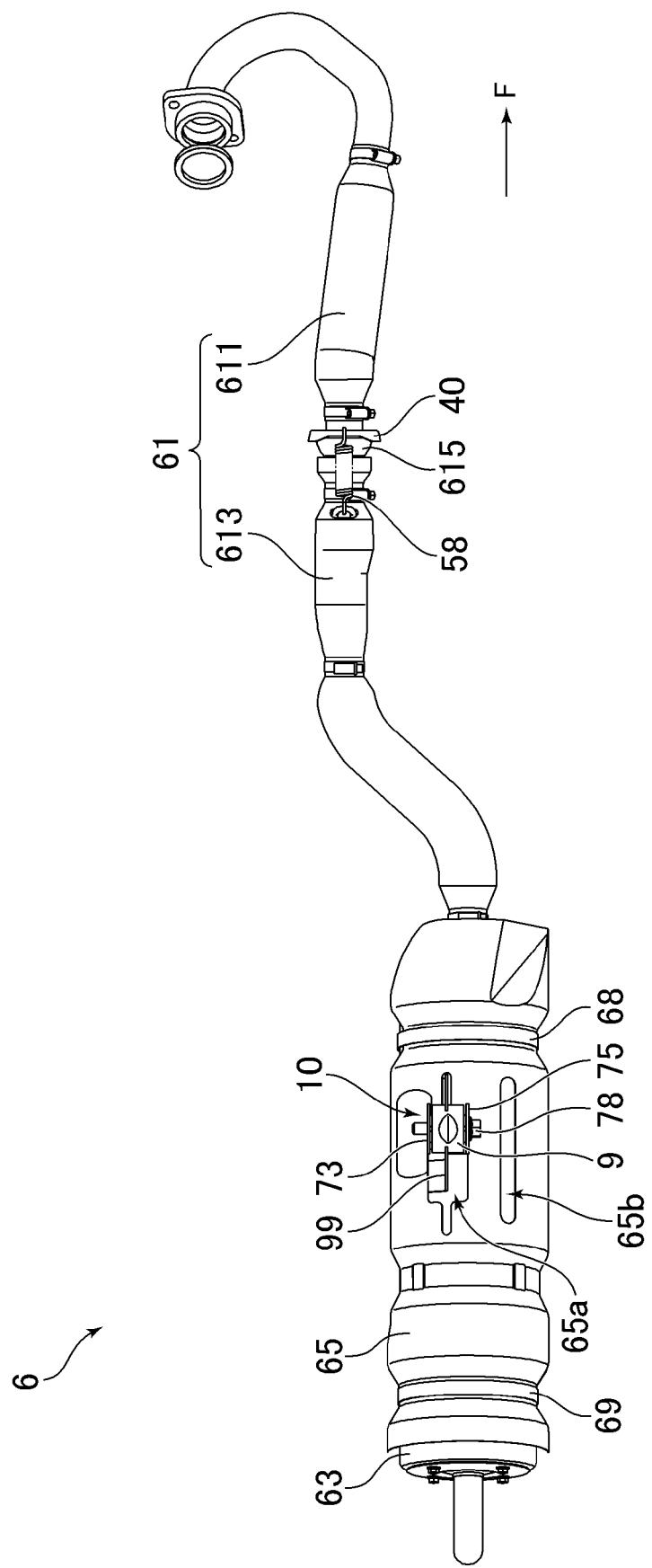
FIG. 11 is a plan view of an exhaust device.
Figure 12:
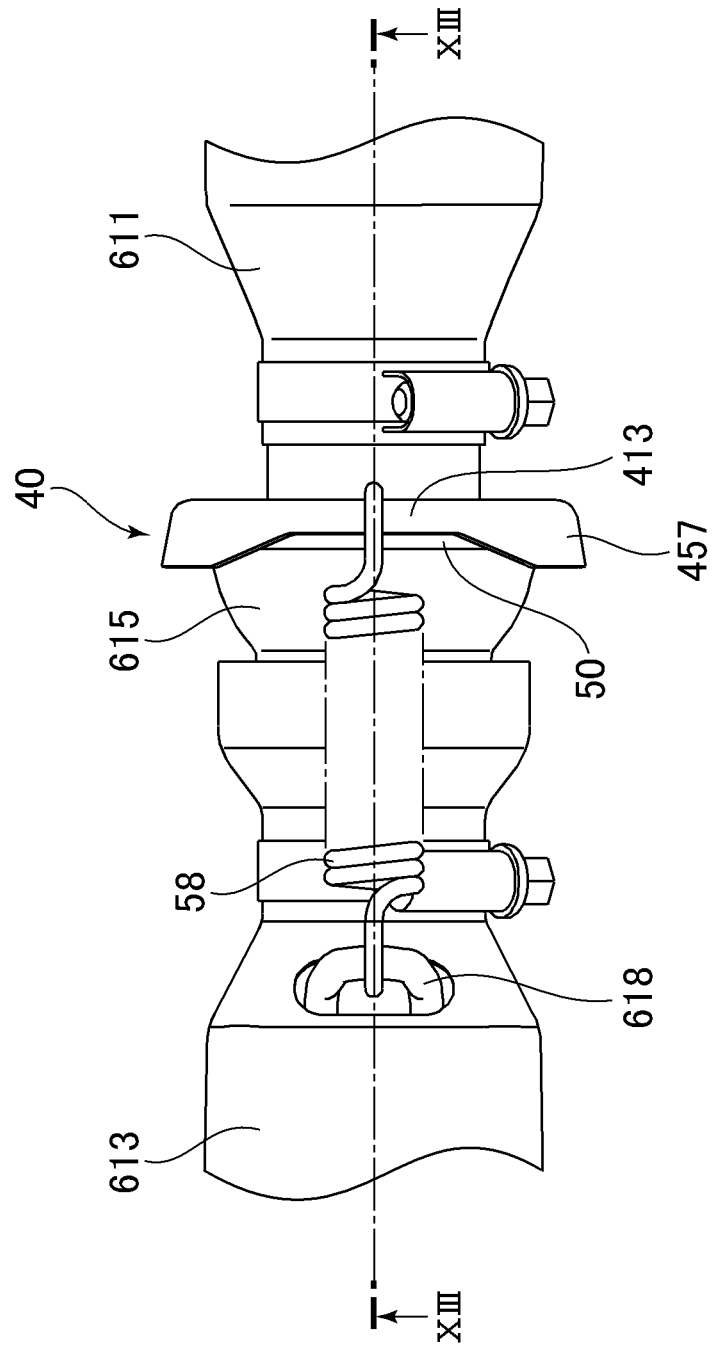
FIG. 12 is an enlarged view of relevant parts of FIG. 11.
Figure 13:
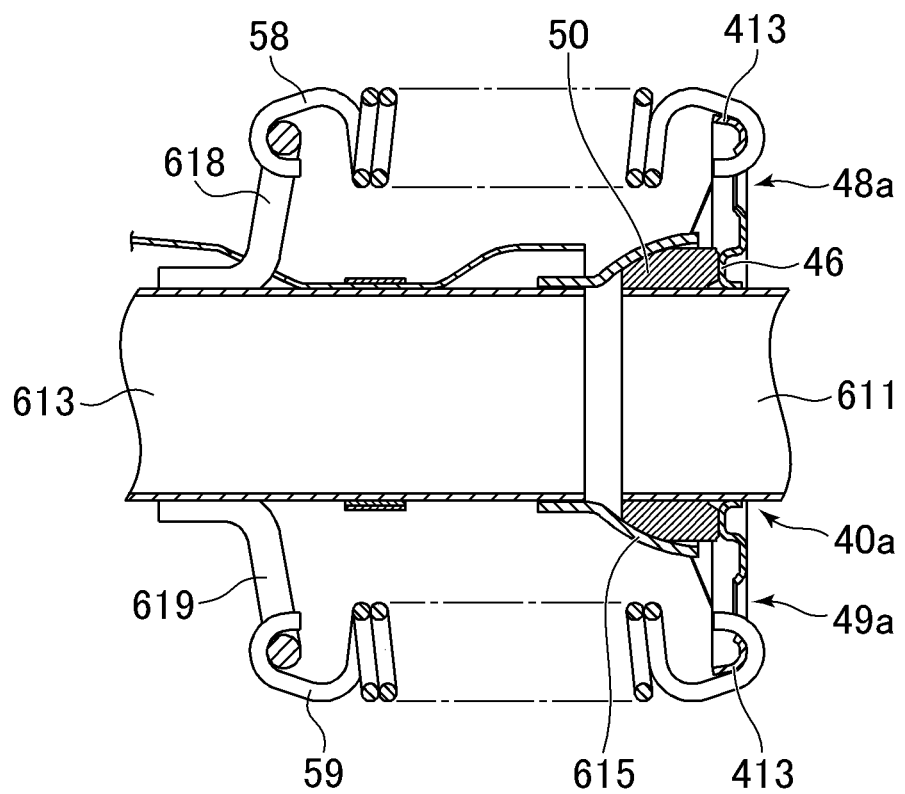
FIG. 13 is a sectional view taken along the line XIII-XIII of FIG. 2.

FIG. 11 is a plan view of the exhaust device 6. The arrow F of FIG. 11 indicates the forward direction of the vehicle 1. FIG. 12 is an enlarged view for illustrating relevant parts of FIG. 11. FIG. 13 is a sectional view of FIG. 12 taken along the line XIII-XIII.

Figure 14:
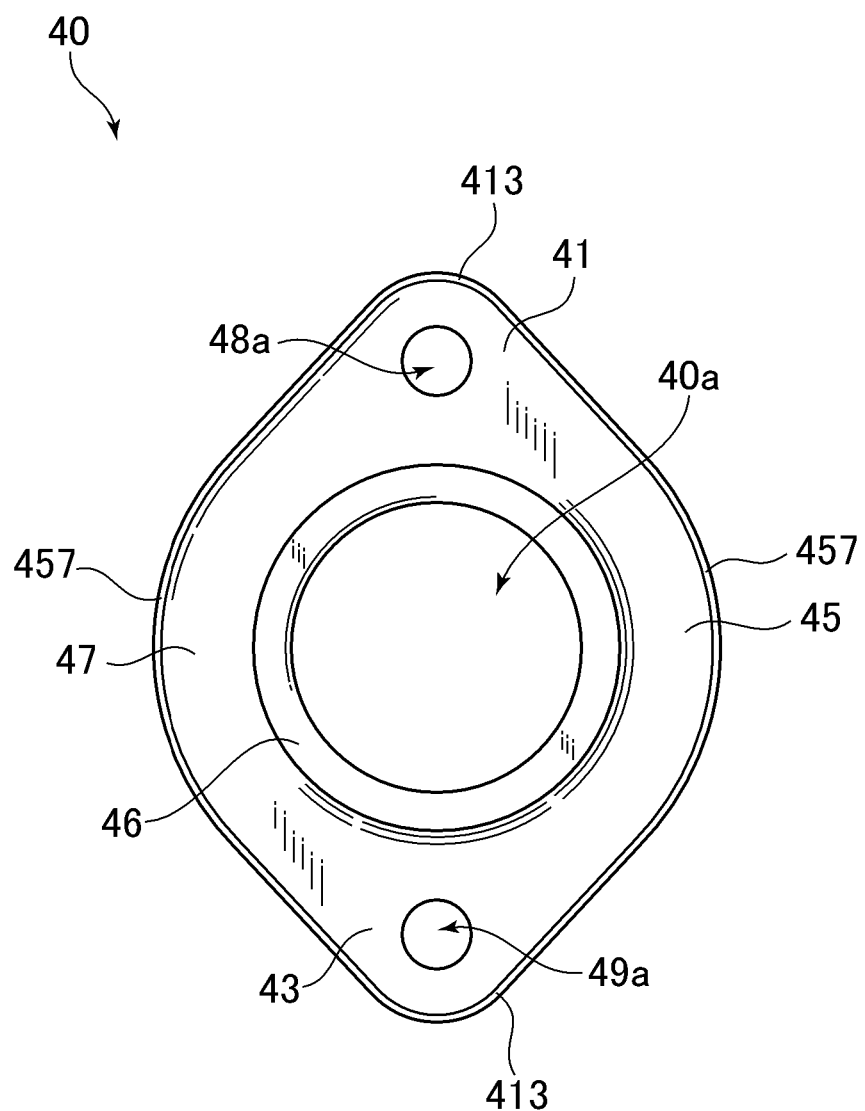
FIG. 14 is a front view of a ring stop.
Figure 15:
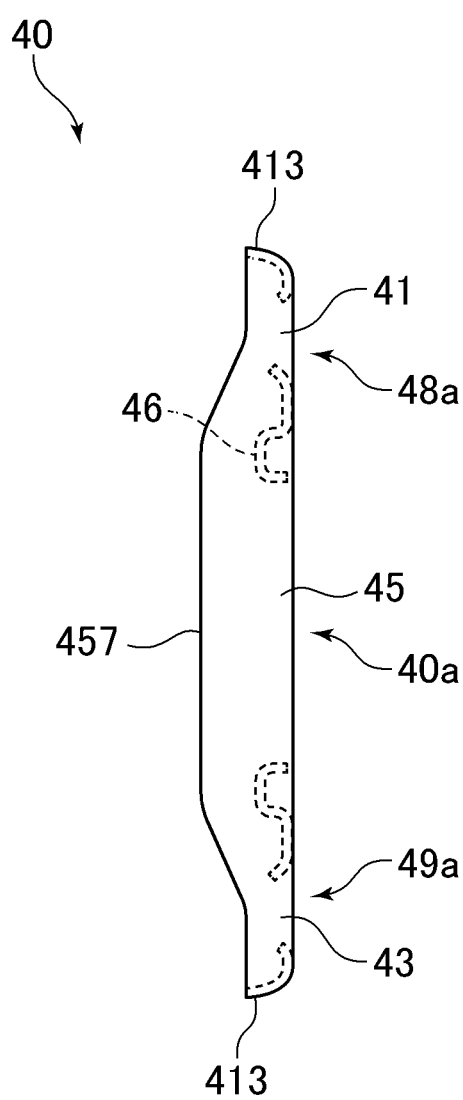
FIG. 15 is a side view of the ring stop.

FIG. 14 and FIG. 15 area front view and a side view, respectively, of a ring stop 40 included in the exhaust device 6. A front side in FIG. 14 and FIG. 15 corresponds to a surface of the ring stop 40 arranged in the exhaust device 6 as viewed from the rear side in the forward direction.

The exhaust pipe 61 of the exhaust device 6 can include a front part 611 coupled to the engine 3 and a rear part 613 coupled to the muffler 63. A coupled portion between the front part 611 and the rear part 613 has a spherical joint structure.

A spherical gasket 50 having a convex spherical surface that projects rearward is provided to a rear end of the front part 611 of the exhaust pipe 61. The spherical gasket 50 is formed into an annular shape and is fixed over an outer periphery of the front part 611 by press-fitting or the like. The spherical gasket 50 is made of, for example, graphite. Further, the ring stop 40 held in contact with the front surface of the spherical gasket 50 is fixed to the front part 611 of the exhaust pipe 61 by welding or the like.

A flare flange 615 having a concave spherical inner surface that is recessed forward is provided to a front end of the rear part 613 of the exhaust pipe 61. The flare flange 615 is formed into a cylindrical shape having a diameter enlarged in the forward direction, and is fixed to an outer periphery of the rear part 613 by welding or the like. Further, hook portions 618 and 619 are fixed to the rear part 613 of the exhaust pipe 61 on the rear side of the flare flange 615 by welding or the like.

A spring 58 is provided between the ring stop 40 and the hook portion 618, and a spring 59 is provided between the ring stop 40 and the hook portion 619. The ring stop 40 and the hook portions 618 and 619 are attracted to each other by restoring forces of the springs 58 and 59. In this manner, an outer surface of the spherical gasket 50 is brought into pressure-contact with an inner surface of the flare flange 615 so as to be slidable, thereby demonstrating a gas sealing property while allowing an angular change between the front part 611 and the rear part 613 of the exhaust pipe 61.

As illustrated in FIG. 13, FIG. 14, and FIG. 15, the ring stop 40 has an opening 40a into which the front part 611 of the exhaust pipe 61 is inserted, and is formed in an annular shape as a whole. The ring stop 40 is formed by, for example, press working on a metal plate made of a metal such as iron or steel. At a periphery of the opening 40a, there is formed an annular convex surface 46 projecting rearward, which is configured to press the spherical gasket 50 rearward.

An upper portion 41 and a lower portion 43 of the ring stop 40 project radially outward as compared to side portions 45 and 47. An opening 48a configured to hook the spring 58 is formed in the upper portion 41, and an opening 49a configured to hook the spring 59 is formed in the lower portion 43. The upper portion 41 and the lower portion 43 have a larger curvature than that of the side parts 45 and 47 as viewed in an opening direction of the opening 40a, and are formed into an angular shape that is convex radially outward. Specifically, the upper portion 41 and the lower portion 43 have a smaller curvature radius than that of the side portions 45 and 47, and are therefore curved sharply.

A peripheral edge portion of the ring stop 40 is bent rearward over the entire periphery thereof. More specifically, a height (length in the forward and rearward direction) of an edge portion 413 of the upper portion 41 and the lower portion 43 of the peripheral edge portion of the ring stop 40 is smaller than that of an edge portion 457 of the side portions 45 and 47. In other words, the height of the edge portion 457 of the side portions 45 and 47 is larger than that of the edge portion 413 of the upper portion 41 and the lower portion 43. Further, the height gradually increases from the edge portion 413 of the upper portion 41 and the lower portion 43 to the edge portion 457 of the side portions 45 and 47. In other words, the height gradually decreases from the edge portion 457 of the side portions 45 and 47 to the edge portion 413 of the upper portion 41 and the lower portion 43.

The peripheral edge portion of the ring stop 40 is bent into the shape as described above. Thus, deformation under loads of the springs 58 and 59 can be suppressed even when a plate thickness is reduced. Specifically, reduced weight and ensured rigidity of the ring stop 40 can be achieved.

The height of the edge portion 413 of the upper portion 41 and the lower portion 43 is set relatively small, thereby facilitating the hooking of the springs 58 and 59. Further, the height toward the edge portion 457 of the side portions 45 and 47 is increased, thereby being capable of suppressing the deformation under the loads of the springs 58 and 59. Still further, the height of the edge portion 413 of the upper portion 41 and the lower portion 43 having a relatively large curvature (having a relatively small curvature radius) is set relatively small, thereby being capable of improving ease of manufacturing of the ring stop 40.

Figure 16:
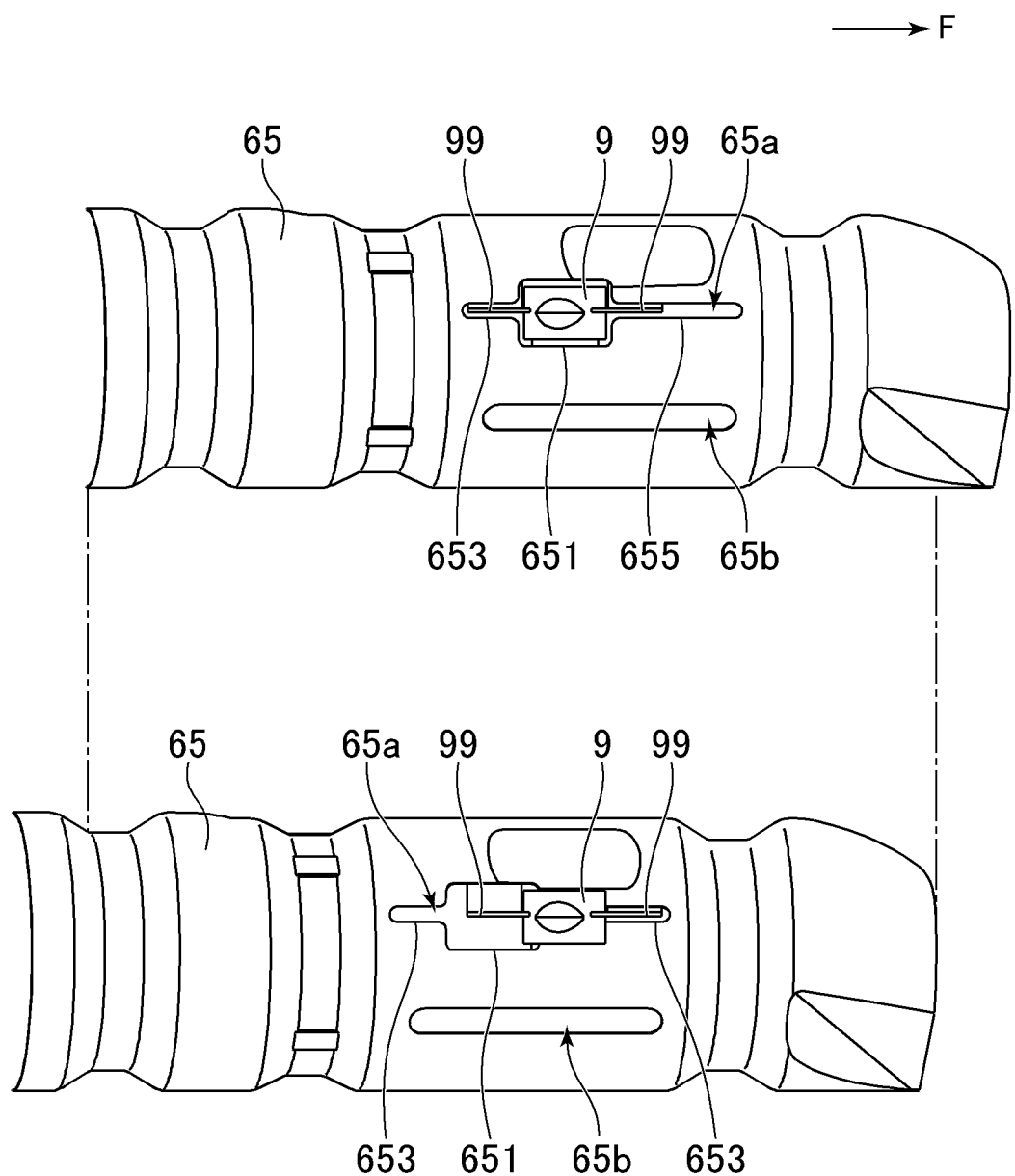
FIG. 16 is a view for illustrating mounting of a protector.

FIG. 16A and FIG. 16B are views for illustrating mounting of the protector 65. FIG. 16A and FIG. 16B are views for illustrating, in plan view, a state in which the protector 65 is mounted to the muffler 63 (not shown) to which the outer cover 9 is mounted through the intermediation of the bracket 99.

Two openings 65a and 65b, each extending in the forward and rearward direction, arranged in the rightward and leftward direction are formed in the protector 65. Of the openings 65a and 65b, the opening 65a positioned on the inner side in the vehicle width direction is used to allow the outer cover 9 and the bracket 99 to pass therethrough. Under a state in which the protector 65 is mounted to the muffler 63, the bracket 99 is arranged inside of the opening 65a (see FIG. 3).

The opening 65a includes a wide portion 651, a narrow portion 653 extending rearward from the wide portion 651, and a narrow portion 655 extending forward from the wide portion 651. The wide portion 651 has a larger width in the rightward and leftward direction than those of the narrow portions 653 and 655. Further, one of the narrow portions 653 and 655 has a larger length in the forward and rearward direction than that of the other.

More specifically, the wide portion 651 has a width and a length that allow passage of the outer cover 9. Meanwhile, each of the narrow portions 653 and 655 has a width and a length that do not allow the passage of the outer cover 9, but allow the passage of the bracket 99, smaller in the rightward and leftward direction than the outer cover 9. Further, the narrow portion 653 has a length that allows passage of a rear end of the bracket 99 when the outer cover 9 passes through the wide portion 651. The narrow portion 655 has a length larger than that of the narrow portion 653, and has a front end that is space away, in a forward direction, from the front end of the bracket 99 when the outer cover 9 passes through the wide portion 651.

For the mounting of the protector 65, first, as illustrated in FIG. 16A, the protector 65 is placed on the muffler 63 (not shown) to which the outer cover 9 is mounted so that the outer cover 9 passes through the wide portion 651 of the opening 65a of the protector 65. At this time, a rear portion of the bracket 99 is inserted into the narrow portion 653, and a front portion of the bracket 99 is inserted into the narrow portion 655. As a result, a portion of the bracket 99, which is located below the outer cover 9, is placed in a state of being arranged inside of the opening 65a (see FIG. 2 and FIG. 3).

Next, as illustrated in FIG. 16B, the protector 65 is moved rearward. More specifically, the protector 65 is moved rearward until the front end of the bracket 99 comes close to the front end of the narrow portion 655. As a result, the wide portion 651 and the outer cover 9 are offset from each other in the forward and rearward direction. The wide portion 651 and the outer cover 9 may partially overlap with each other in a plan view, but are not required to overlap with each other. Thereafter, the protector 65 and the muffler 63 are fixed by fastening bands 68 and 69 (see FIG. 11).

As described above, the wide portion 651 and the outer cover 9 are offset from each other in the forward and rearward direction. As a result, hot air from the muffler 63 can be prevented from concentrating in the wide portion 651 and directly heating the mount device 10 through the wide portion 651. Specifically, the hot air rising from the wide portion 651 mainly passes on the rear side of the mount device 10, and therefore is less likely to contact the mount device 10. In other words, the protector 65 is present in at least a part of a portion between the muffler 63 and the mount device 10. Therefore, the hot air from the muffler 63 is less likely to contact the mount device 10. As a result, a temperature rise of the damper 8 and the like included in the mount device 10 can be suppressed.

Further, in addition to the opening 65a having the wide portion 651, the another opening 65b is also formed in the protector 65. Therefore, the hot air from the muffler 63 can be prevented from concentrating in the wide portion 651.

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:
1. A mount device, comprising:
an inner rod;
a damper made of an elastic material and mounted to the inner rod, the damper comprising:

a plurality of projecting portions projecting radially outward from the inner rod; and small-thickness portions thinner than the plurality of projecting portions in a radial direction, configured so that spaces are formed in the radially outward direction with respect to the small-thickness portions; and an outer cover configured to be mounted to the damper, comprising a plurality of contact surfaces configured to respectively come into contact with the plurality of projecting portions, the contact surfaces having a larger curvature than that of a circumscribed circle of the damper.

2. The mount device according to claim 1, wherein the plurality of projecting portions is two projecting portions projecting in opposite directions from each other; and the plurality of contact surfaces is two contact surfaces opposed to each other.

3. The mount device according to claim 1, wherein the spaces are formed between the small-thickness portions and the outer cover.

4. The mount device according to claim 1, further comprising engagement portions configured to be engaged in an extension of the direction of the inner rod, and wherein said engagement portions are formed on an outer surface of the damper and an inner surface of the outer cover.

5. The mount device according to claim 1, wherein the damper is mounted between first and second flange portions provided on the inner rod; and wherein at least one of the flange portions overlaps with at least a part of the outer cover when viewed in an extension direction of the inner rod.

6. The mount device according to claim 1, wherein a center of the inner rod is offset relative to a center of the circumscribed circle of the damper.

7. A vehicle, comprising:

a vehicle body frame;

an engine supported by the vehicle body frame;

an exhaust device connected to the engine and suspended from the vehicle body frame; and a mount device positioned between the vehicle body frame and the exhaust device, the mount device comprising:

an inner rod fixed to one of a first part of the vehicle body frame and a first part of the exhaust device;

a damper made of an elastic material and mounted to the inner rod; and an outer cover attached to a second part of the vehicle body frame and a second part of the exhaust device so as to be mounted to the damper, the damper comprising:

an upper filling portion configured to fill a gap between an upper portion of an outer surface of the inner rod and an upper portion of an inner surface of the outer cover;

a lower filling portion configured to fill a gap between a lower portion of the outer surface of the inner rod and a lower portion of the inner surface of the outer cover; and small-thickness portions laterally positioned with respect to the outer surface of the inner rod, having smaller thickness than those of the upper filling portion and the lower filling portion, wherein spaces are formed in a radially outward direction of the mount device with respect to the small thickness portions.

8. The vehicle according to claim 7, wherein the upper portion of the inner surface of the outer cover is configured to come into contact with the upper filling portion, and the lower portion of the inner surface of the outer cover is configured to come into contact with the lower filling portion have a larger curvature than that of a circumscribed circle of the damper.

9. The vehicle according to claim 7, wherein the spaces are formed between the small-thickness portions and the outer cover.

10. The vehicle according to claim 7, further comprising engagement portions, configured to be engaged in an extension direction of the inner rod, are formed on an outer surface of the damper and an inner surface of the outer cover.

11. The vehicle according to claim 7, wherein the damper is mounted between first and second flange portions provided on the inner rod; and wherein at least one of the flange portions overlaps with at least a part of the outer cover when viewed in an extension direction of the inner rod.

12. The vehicle according to claim 7, wherein a center of the inner rod is offset relative to a center of the circumscribed circle of the damper.

13. The vehicle according to claim 7, wherein the exhaust device comprises a muffler configured to be suspended from the vehicle body frame and through the intermediation of the mount device, in an inclined posture with respect to a horizontal direction, and wherein the upper filling portion and the lower filling portion are arranged in upward and downward direction.

14. The vehicle according to claim 7, wherein the exhaust device comprises:

an exhaust pipe connected to the engine so that it extends in a rearward direction; and a muffler connected to the exhaust pipe, which extends in a rearward direction, and wherein a direction from the inner rod to the small-thickness portions is in a forward direction or a rearward direction relative to the vehicle.

* * * * *